US012461260B2

(12) United States Patent
Meyer (10) Patent No.: US 12,461,260 B2
(45) Date of Patent: Nov. 4, 2025

(54) SEISMIC SOURCE

(71) Applicant: Arizona Board of Regents on Behalf of the University of Arizona, Tucson, AZ (US)

(72) Inventor: Steve Meyer, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 435 days.

(21) Appl. No.: 18/176,774

(22) Filed: Mar. 1, 2023

(65) Prior Publication Data
US 2023/0280487 A1    Sep. 7, 2023

Related U.S. Application Data

(60) Provisional application No. 63/315,245, filed on Mar. 1, 2022.

(51) Int. Cl.
| | |
|---|---|
| *G01V 1/09* | (2006.01) |
| *E02D 7/18* | (2006.01) |
| *G01V 1/155* | (2006.01) |
| *B64G 1/10* | (2006.01) |
| *B64G 1/62* | (2006.01) |
| *E02D 11/00* | (2006.01) |
| *G01V 1/053* | (2006.01) |

(52) U.S. Cl.
CPC ............. *G01V 1/155* (2013.01); *E02D 7/18* (2013.01); *G01V 1/09* (2013.01); *B64G 1/1071* (2023.08); *B64G 1/62* (2013.01); *E02D 11/00* (2013.01); *G01V 1/053* (2013.01)

(58) Field of Classification Search
CPC .......... G01V 1/053; G01V 1/09; G01V 1/153; G01V 1/155; B64G 1/62; E02D 7/17; E02D 11/00
USPC ............... 173/49, 90, 91, 101, 124, 128, 52; 299/37.2; 175/22; 244/172.6
See application file for complete search history.

(56) References Cited

U.S. PATENT DOCUMENTS

| | | | | |
|---|---|---|---|---|
| 4,143,719 A | * | 3/1979 | Furukawa ................. | E02D 7/18 173/101 |
| 4,257,648 A | * | 3/1981 | Bodine ..................... | B06B 1/16 299/37.2 |
| 5,281,775 A | * | 1/1994 | Gremillion ............... | E21B 7/26 175/22 |
| 5,355,716 A | * | 10/1994 | Castelli ................... | G01P 21/00 73/12.01 |

(Continued)

*Primary Examiner* — Scott A Smith
(74) *Attorney, Agent, or Firm* — Ballard Spahr LLP (57) ABSTRACT

An assembly for providing an active seismic source includes a motor and a drive shaft coupled to the motor. A crank is coupled to the drive shaft. The motor is configured to impart rotation of the crank in a first rotational direction. A one-way bearing permits rotation of the crank relative to the drive shaft in the first rotational direction and inhibits rotation of the crank relative to the drive shaft in an opposed second rotational direction. The assembly also includes a strike plate, a track, and a hammer that is movable along the track along an axis that extends toward and away from the strike plate. The hammer contacts the strike plate. A biasing element biases the hammer toward the strike plate. A linkage arm couples the hammer to the crank and translates rotational movement of the crank to linear movement of the hammer.

20 Claims, 7 Drawing Sheets

(56) References Cited

U.S. PATENT DOCUMENTS

| | | | | |
|---|---|---|---|---|
| 5,355,964 A * | 10/1994 | White | ............... | E02D 7/18 |
| | | | | 173/1 |
| 5,388,470 A * | 2/1995 | Marsh, Jr. | ............... | F03G 3/00 |
| | | | | 74/61 |
| 5,483,026 A * | 1/1996 | Hasbrouck | ............... | G01V 1/053 |
| | | | | 367/75 |
| 5,786,537 A * | 7/1998 | Anstey | ............... | G01V 1/153 |
| | | | | 73/662 |
| 6,691,797 B1 * | 2/2004 | Hart | ............... | E02D 11/00 |
| | | | | 173/128 |
| 2014/0262596 A1 * | 9/2014 | Gomez | ............... | G01V 1/09 |
| | | | | 181/121 |
| 2015/0027744 A1 * | 1/2015 | Ozkan | ............... | E02D 7/18 |
| | | | | 173/49 |
| 2023/0280487 A1 * | 9/2023 | Meyer | ............... | G01V 1/09 |
| | | | | 244/172.6 |

* cited by examiner

SEISMIC SOURCE

CROSS-REFERENCE TO RELATED APPLICATION

This application claims priority to and the benefit of the filing date of U.S. Provisional Patent Application No. 63/315,245, filed Mar. 1, 2022, the entirety of which is hereby incorporated by reference herein.

STATEMENT OF GOVERNMENT SUPPORT

This invention was made with government support under Grant No. 80NSSC19K0671, awarded by NASA. The government has certain rights in the invention.

FIELD

This disclosure relates to apparatuses for providing a seismic source.

BACKGROUND

There is a need to create an active seismic source on interplanetary landing spacecraft for the characterization of lunar and planetary geology. Natural seismic events are unpredictable both in terms of timing and content. Thus, an artificial signal created on demand and with a known seismic signal content is strongly desired. However, many terrestrial analogs require ordnance or are very heavy and require large power draw. A compact, lightweight design that relies on low power consumption is much more desirable for spacecraft, which have extremely limited resources for mass and energy.

SUMMARY

Described herein, in various aspects, is an assembly for providing an active seismic source. The assembly can comprise a motor and a drive shaft coupled to the motor. A crank can be coupled to the drive shaft. The motor can be configured to impart rotation of the crank in a first rotational direction. A one-way bearing can permit rotation of the crank relative to the drive shaft in the first rotational direction and inhibit rotation of the crank relative to the drive shaft in an opposed, second rotational direction. The assembly can further comprise a strike plate, a track, and a hammer that is movable along the track along an axis that extends toward and away from the strike plate. The hammer can be configured to contact the strike plate. A biasing element can be configured to bias the hammer toward the strike plate. A linkage arm can couple the hammer to the crank. The linkage arm can be configured to translate rotational movement of the crank to linear movement of the hammer.

A lander comprising such an assembly is also disclosed.

Also disclosed are methods of using the assembly.

Additional advantages of the disclosed apparatuses, systems, and methods will be set forth in part in the description that follows, and in part will be obvious from the description, or may be learned by practice of the claimed invention. The advantages of the disclosed devices and systems will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE DRAWINGS

These and other features of the preferred embodiments of the invention will become more apparent in the detailed description in which reference is made to the appended drawings wherein:

FIGS. 7A-7B show exemplary seismic activity data generated by the assembly as disclosed herein.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a," "an," and "the" include plural referents unless the context clearly dictates otherwise. For example, use of the term "a spring" can refer to one or more of such springs, and so forth.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Optionally, in some aspects, when values are approximated by use of the antecedent "about," it is contemplated that values within up to 15%, up to 10%, up to 5%, or up to 1% (above or below) of the particularly stated value can be included within the scope of those aspects. Similarly, in some optional aspects, when values are approximated by use of the terms "substantially" or "generally," it is contemplated that values within up to 15%, up to 10%, up to 5%, or up to 1% (above or below) of the particular value can be included within the scope of those aspects. When used with respect to an identified property or circumstance, "substantially" or "generally" can refer to a degree of deviation that is sufficiently small so as to not measurably detract from the identified property or circumstance, and the exact degree of deviation allowable may in some cases depend on the specific context.

As used herein, the terms "optional" or "optionally" mean that the subsequently described event or circumstance may or may not occur, and that the description includes instances where said event or circumstance occurs and instances where it does not.

As used herein, the term "at least one of" is intended to be synonymous with "one or more of." For example, "at least one of A, B and C" explicitly includes only A, only B, only C, and combinations of each.

The word "or" as used herein means any one member of a particular list and, unless context dictates otherwise, can also include any combination of members of that list.

It is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

The following description supplies specific details in order to provide a thorough understanding. Nevertheless, the skilled artisan would understand that the apparatus, system, and associated methods of using the apparatus can be implemented and used without employing these specific details. Indeed, the apparatus, system, and associated methods can be placed into practice by modifying the illustrated apparatus, system, and associated methods and can be used in conjunction with any other apparatus and techniques conventionally used in the industry.

Disclosed herein, in various aspects and with reference to FIGS. 1-4, is an assembly 10 comprising a motor 12 and a drive shaft 14 coupled to the motor 12. In some optional aspects, the drive shaft 14 can be integrally formed with the motor. A crank 16 can be coupled to the drive shaft 14. The motor 12 can be configured to impart rotation of the crank 16 in a first rotational direction (indicated by the arrow in FIG. 1). A one-way bearing 20 can permit rotation of the crank 16 relative to the drive shaft 14 in the first rotational direction and inhibit rotation of the crank 16 relative to the drive shaft in an opposed, second rotational direction. The assembly 10 can further comprise a strike plate 30, a track 32, and a hammer 34. The hammer 34 can be movable along the track 32 along an axis 36 that extends toward and away from the strike plate. The hammer 34 can be configured to contact the strike plate 30. A biasing element 38 can be configured to bias the hammer 34 toward the strike plate 30. A linkage arm 40 can couple the hammer 34 to the crank 16. The linkage arm 40 can be configured to translate rotational movement of the crank 16 to linear movement of the hammer 34 (along the axis 36).

The assembly 10 can further comprise gearing 15 that couples the motor 12 to the crank 16. For example, the motor 12 and gearing can be provided as a gearmotor (e.g., a motor having an integral gearbox). Accordingly, in some aspects, the motor 12 can rotate at a greater speed than the crank 16, while stepping up the torque provided to the crank. The gearing can be selected to permit the motor to meet maximum power draw requirements.

In some aspects, the linkage arm 40 can permit play along the axis 36 of the hammer relative to the crank. That is, the linkage arm 40 can be configured so that, for a given position of the crank 16, the linkage arm 40 does not fix an exact spacing of the hammer 34 relative to the crank 16, but instead allows some movement of the hammer relative to the crank. Advantageously, this can permit the hammer 34 to strike the strike plate 30 while allowing the crank to continue rotating, rather than rebounding backward and against the locking direction (the opposed second direction) of the one-way bearing 20.

Figure 6:
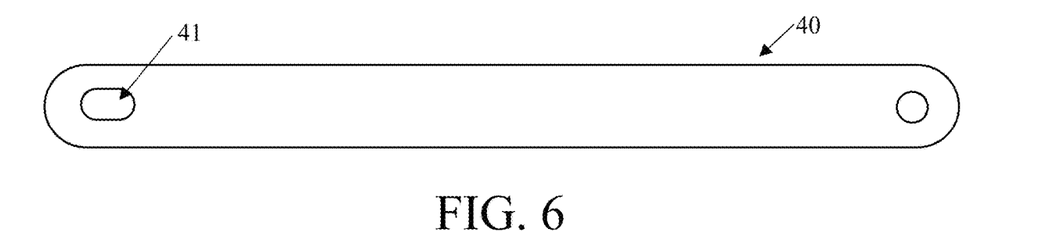
FIG. 6 shows a side view of a linkage arm of the assembly as disclosed herein.

For example, the linkage arm 40 can have a length, and the linkage arm 40 can define a slot 41 (FIG. 6) that is elongate along the length of the linkage arm. The assembly 10 can comprise a fastener 42 that extends through the slot 41 of the linkage arm 40 and couples the hammer 34 to the linkage arm. The fastener 42 can be slidable within the slot to provide the play along the axis 36 of the hammer 34 relative to the crank 16.

The hammer 16 can be movable along the axis 36 by a predetermined maximum distance from the strike plate 30. For example, after one rotation of the crank 16, the hammer 34 can move the predetermined maximum distance from the strike plate 30 and then back to the strike plate. The predetermined distance and a force provided by the biasing element can cooperate to define an impact energy of the hammer against the strike plate. For example, the impact energy can be the sum of potential energy of the spring due to its compression by the predetermined maximum distance of the hammer from the strike plate and the gravitational potential energy of the hammer from its weight, less any losses to friction during movement. In some aspects, weight of the hammer (gravitational potential energy) and losses due to friction can be negligible. In some optional aspects, the impact energy can be between 5 joules and 25 joules. For example, the impact energy can be from 10 joules to 20 joules (e.g., about 10.5 joules or about 15.1 joules). In some optional aspects, the impact energy can be from 3 joules to 100 joules. For example, the impact energy can be from 3 joules to 10 joules or from 20 joules to 30 joules, or from 30 joules to 50 joules, or from 50 joules to 100 joules, or more.

In some aspects, the predetermined maximum distance can be from about one half inch to about three inches (e.g., optionally, about 1 inch or about 1.2 inches).

In some aspects, the biasing element 38 can be a spring having a spring constant from about 100 lb/in to about 500 lb/in or from about 150 lb/in to about 200 lb/in (e.g., about 186 lb/in).

In some aspects, the biasing element 38 can be a coil spring.

Figure 4:
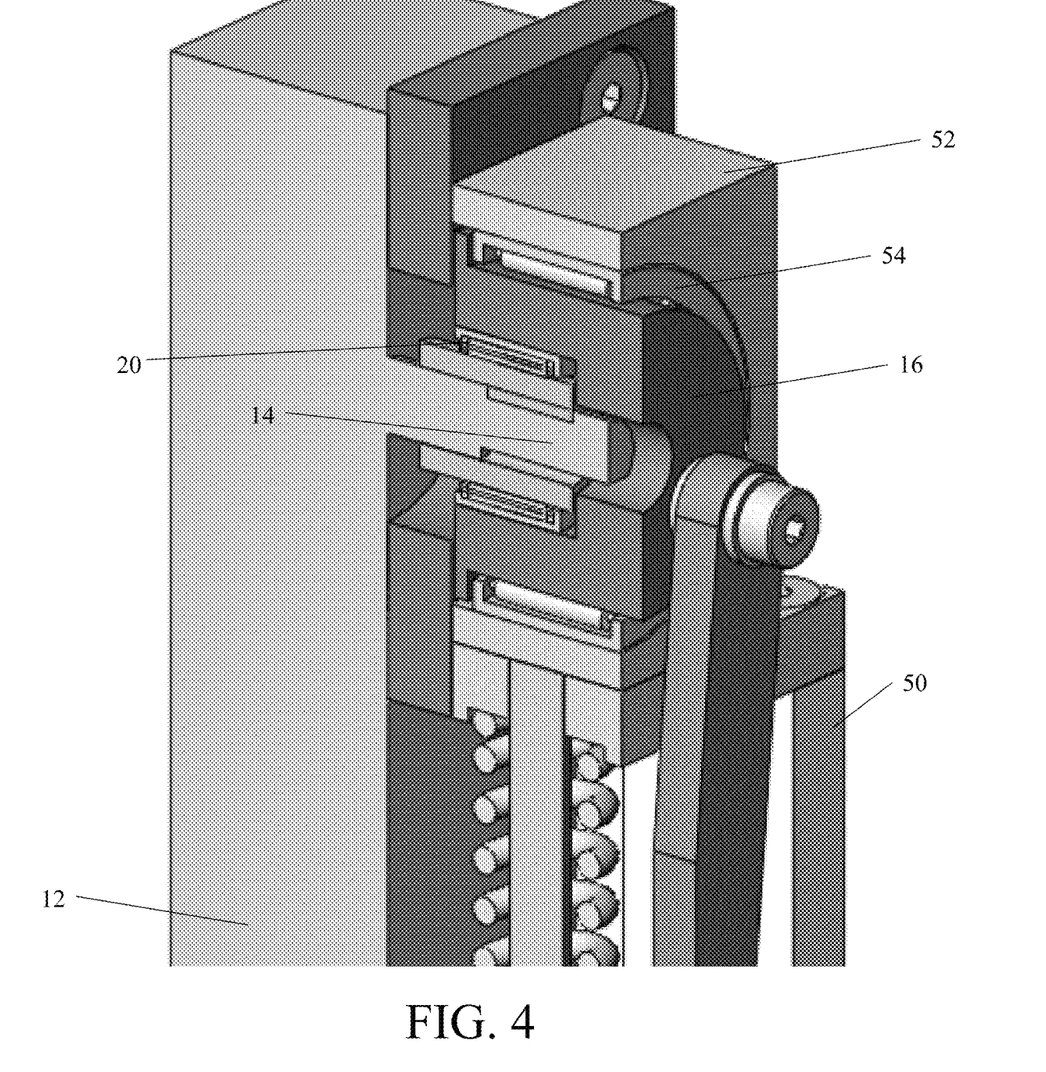
FIG. 4 is a partial perspective cross-sectional view of the assembly of FIG. 1.
Figure 8:
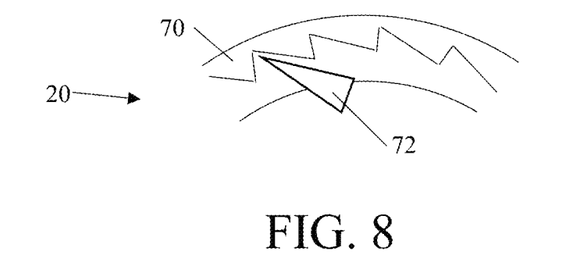
FIG. 8 is a schematic partial view of an exemplary pawl and ratchet one-way bearing.

In some aspects, the one-way bearing 20 can be a locking needle roller bearing (FIG. 4). In some aspects, and as shown in FIG. 8, the one-way bearing 20 can comprise a pawl 70 and ratchet 72.

Referring to FIGS. 1-4, in some aspects, the track 32 can comprise, or be embodied by, a shaft 35 or a plurality of shafts. In some exemplary aspects, the shaft(s) 35 can be cylindrical. In other aspects, the shaft(s) 35 can have any suitable cross-sectional profile (e.g., square or rectangular). The assembly 10 can comprise a bushing 33 that is slidable along the track 32 (e.g., shaft). The hammer 34 can be coupled to the bushing 33.

In some aspects, the track 32 can be or comprise a spline shaft. For example, the spline shaft of the track 32 can define one or more grooves that receive corresponding complementary features of the bushing 33. This can inhibit pivoting of the bushing 33 about the shaft, which could lead to binding of the crank and linkage arm.

The biasing element 38 can be a spring that is coiled around the track 32 (e.g., the shaft 35).

In some aspects, the assembly 10 can comprise a crank housing 52. The crank 16 can be rotatable relative to the crank housing 52. A bearing 54 can permit rotation of the crank relative to the crank housing 52.

Figure 1:
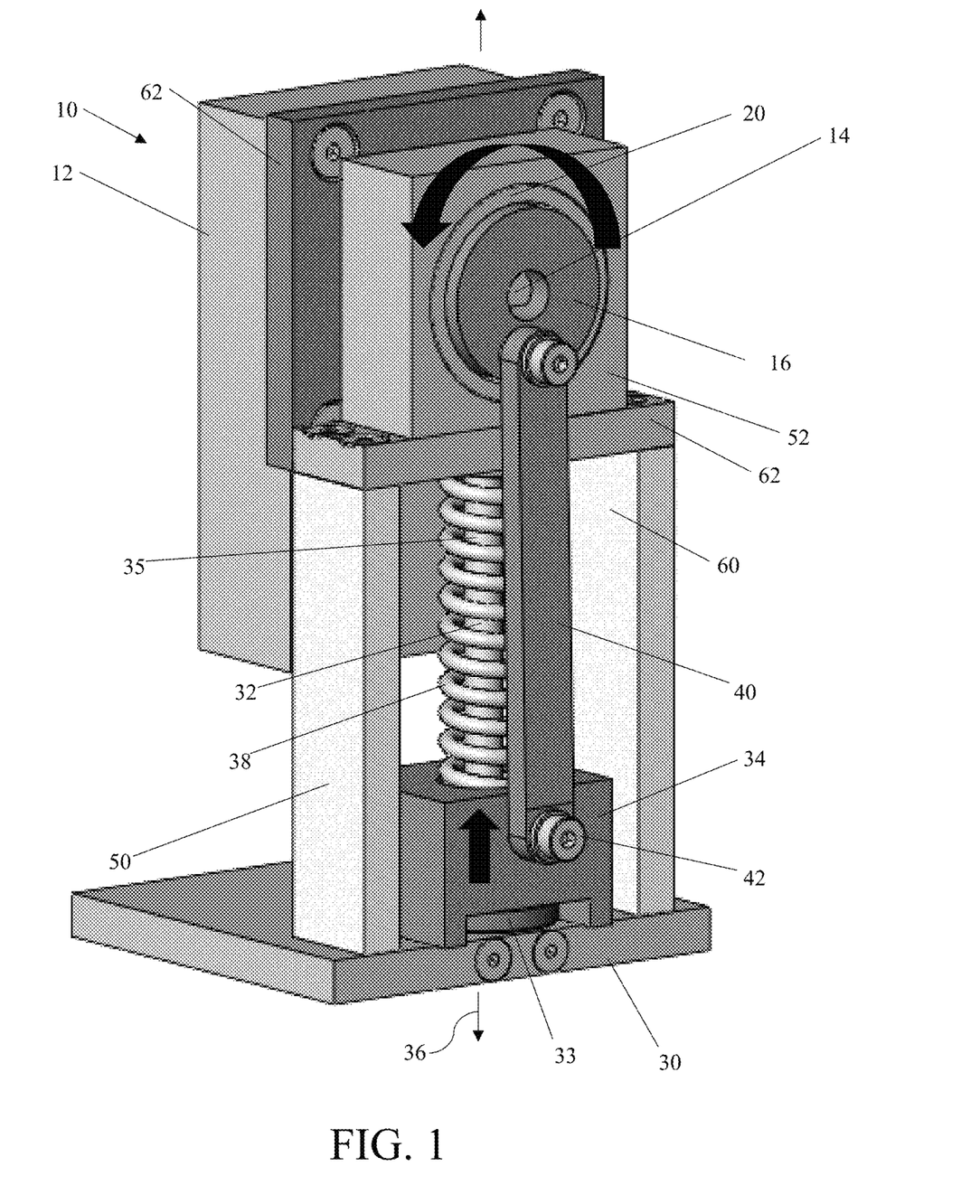
FIG. 1 is a perspective view of an assembly for providing an active seismic source as disclosed herein, showing a hammer in a first position relative to an anvil.
Figure 2:
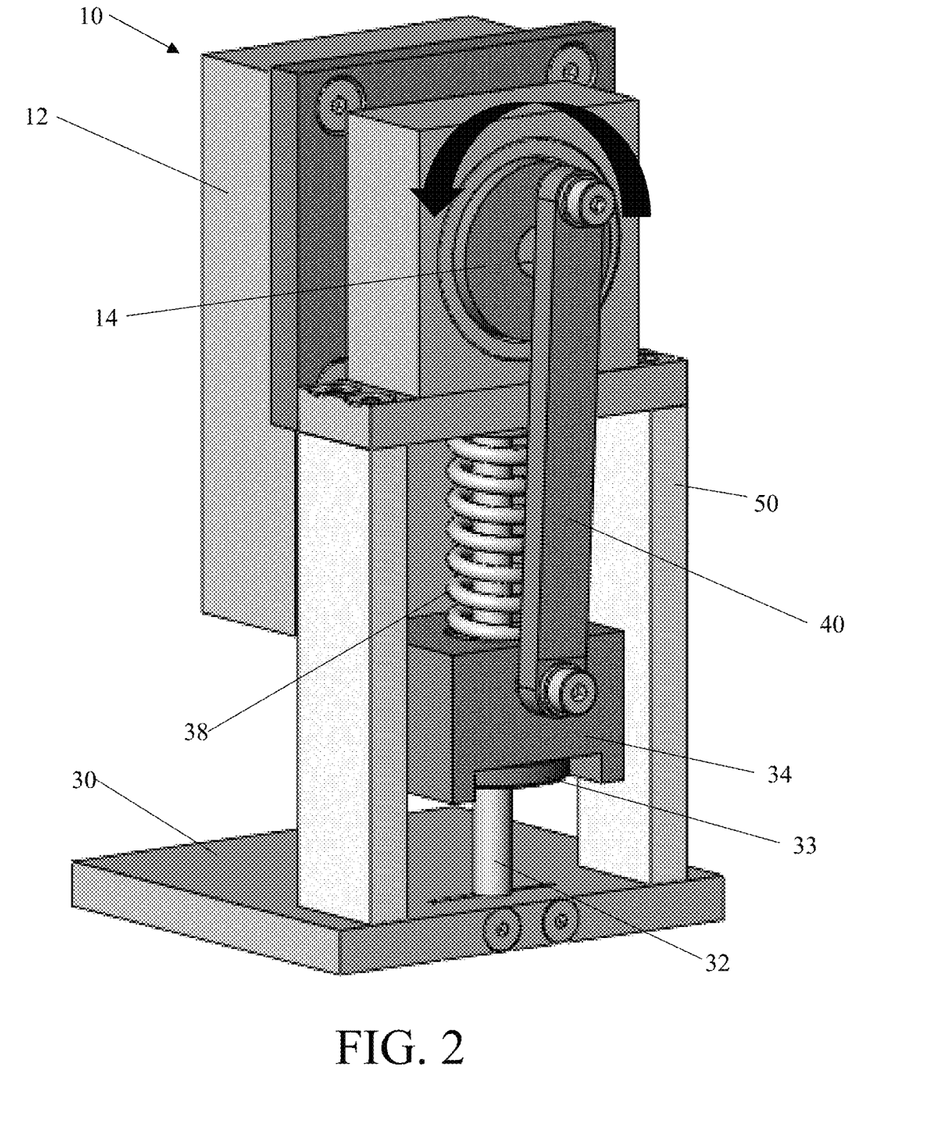
FIG. 2 is a perspective view of the assembly of FIG. 1, with the hammer in a second position, prior to the hammer being accelerated toward the anvil.
Figure 3:
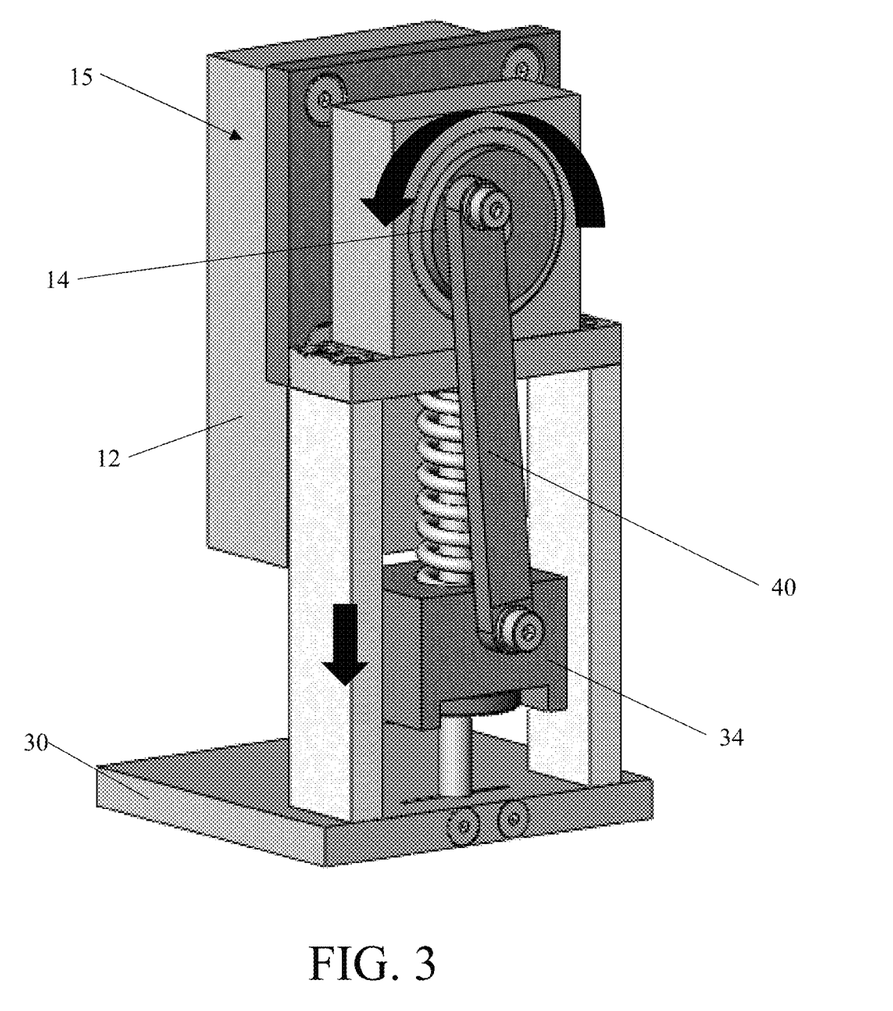
FIG. 3 is a perspective view of the assembly of FIG. 1, with the hammer in a third position in which the hammer is being accelerated toward the anvil.

A frame 50 can couple the strike plate 30 to the motor 12. For example, as shown in FIG. 2, the frame 50 can comprise a plurality of elongate supports 60 (e.g., columns, legs, or beams) that extend between and are secured to the strike plate 30 and a support track plate 62. The track support plate 62 can couple to the crank housing 52. The shaft 35 can couple to, and extend between, the strike plate 30 and the track support plate 62. A motor support plate 64 can couple to the track support plate 62, and the motor 12 can, in turn, couple to the motor support plate 64. Accordingly, in some aspects, the frame 50 can comprise the elongate supports 60, support track plate 62, and motor support plate 64. In some aspects, the frame 50 can be assembled with fasteners (e.g., optionally, screws, bolts, pins, clips, or clamps).

In some aspects, the motor 12 can have a peak power output of less than 30 watts or from about 15 Watts to about 25 Watts (e.g., about 22.4 Watts). In some aspects, the motor 12 can have an average power output of less than 15 Watts (e.g., about 11.2 Watts). In this way, the assembly 10 can be low power and suitable for a landing spacecraft.

The motor 12 can be a space-rated motor. For example, the motor can be suited for enduring and operating at extreme temperatures, such as sub-zero Celsius temperatures that are found in space and on other planets. The motor can further be suited for cyclic heating and cooling exposure. The motor can be configured for high ultraviolet exposure. Still further, the motor can be a high quality motor that is engineered for low likelihood of failure. Further, the motor 12 can have a power rating available from solar panels (e.g., from a lander or from solar panels carried by an individual to a remote location).

In some aspects, the assembly 10 can be generally lightweight. For example, it is contemplated that mass of each element other than the hammer can be minimized. Accordingly light-weight materials such as aluminum or titanium can be used to form the assembly 10. In some aspects, the assembly 10 can have a mass under 5 kg, or under 4 kg, or under 3 kg, or about 2 kg, or under 2 kg, or less than 1 kg.

Further, it can be advantageous for the hammer not to rebound, but instead to transfer its kinetic energy to the ground. Accordingly, materials can be selected to have minimized resiliency upon impact.

Figure 5:
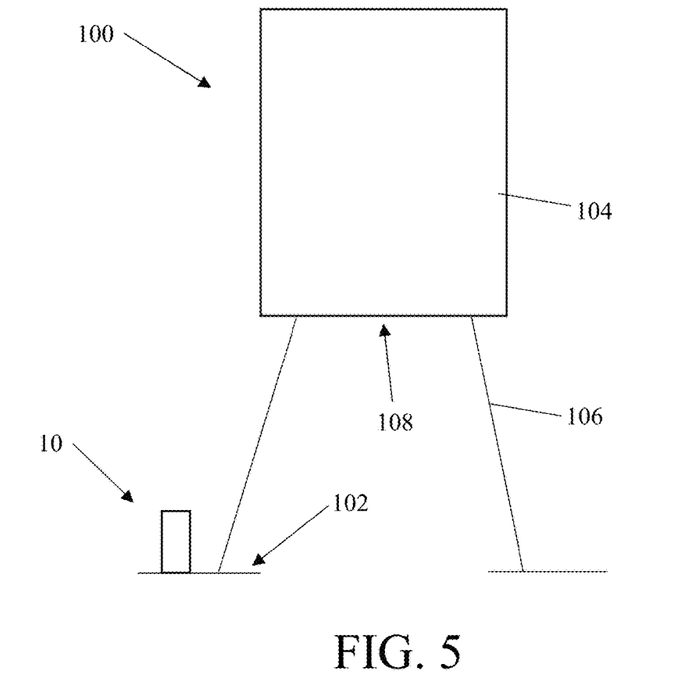
FIG. 5 is a schematic view of a lander as disclosed herein.

A lander 100 (e.g., an interplanetary spacecraft) can comprise at least one assembly for providing an active seismic source as disclosed herein. For example, the lander can comprise at least one footpad 102 that is configured to contact or impact a surface (e.g., a surface of an astronomical body, a planetary surface such as soil). The assembly 10 for providing an active seismic source can be integral to or otherwise permanently associated with the footpad 102. For example, the footpad 102 can define the strike plate 30 of the at least one assembly. In various aspects, the lander 100 can comprise a body 104 and a plurality of legs 106 that extend therefrom. The footpad(s) 102 can be positioned at the end of the legs 106.

In some aspects, the lander can comprise a plurality of assemblies for providing an active seismic source as disclosed herein. For example, the lander can comprise at least a first footpad and a second footpad. The first footpad can define the strike plate of a first assembly for providing an active seismic source, and the second footpad can define the strike plate of the second assembly for providing an active seismic source.

In further aspects, the lander can comprise a belly that is configured to contact a planetary surface. For example, the lander can comprise a body 104 having a lower surface 108 that is configured for contact with the planetary surface. In some aspects, the lander 100 can comprise legs 106 that are configured for contacting the planetary surface. The lander 100 can then adjust to position the lower surface 108 of the body 104 against the planetary surface. For example, the legs can comprise hinges that permit lowering the body 104 relative to the portion of the legs (or footpads 102) in contact with the planetary surface). In some aspects, the belly can define the strike plate 30 of the assembly for providing an active seismic source.

In some aspects, the lander 100 can comprise a seismometer. In some aspects, the seismometer can be laterally spaced from the assembly 10. For example, the seismometer can be at least 1 foot from the assembly 10, or from about 1 foot to about 10 feet, or about 1.5 feet, or about 3 feet, or about 6 feet. In various aspects, the seismometer can be positioned on another footpad 102, within the body 104 of the lander 100 (e.g., within the belly of the lander configured for contact with the planetary surface), or deployable away from the lander (e.g., on an arm or on an independent robot) in order to space the seismometer from the assembly 10.

Figure 7A:
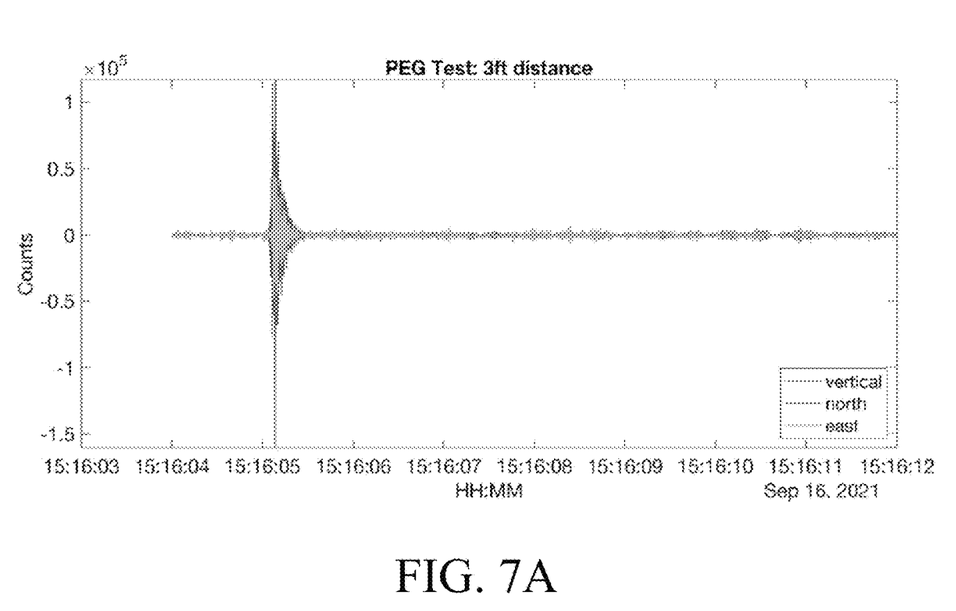
FIG. 7A shows amplitude data over time as measured by seismometers at different locations.
Figure 7B:
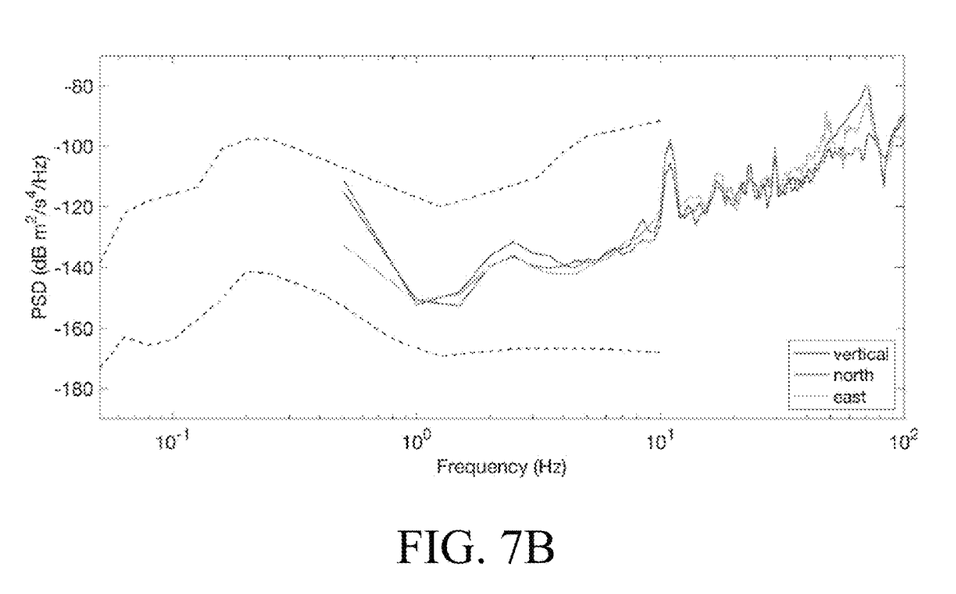
FIG. 7B shows a Fourier transform of the seismic data, illustrating amplitude at different frequencies.

A method of using the assembly 10 can comprise inducing seismic waves and measuring the seismic waves with a seismometer. FIGS. 7A-7B illustrates seismic waves generated by an embodiment of the assembly 10. The seismic waves are shown in amplitude over time (FIG. 7A) as well as amplitude at each frequency (FIG. 7B). The seismic waves can be indicative of material proximate to the planetary surface. For example, the seismic waves can be indicative of the materials and material properties (e.g., loose sand vs. hard rock) of the surface/ground at and around the assembly 10 and between the assembly 10 and the seismometer.

EXAMPLE EMBODIMENT

The assembly can comprise a gear-motor that rotates a crank that lifts a linear slider (e.g., a bushing). The linear slider can be mounted in a massive body (e.g., a hammer) and compresses a concentric spring on the slider shaft when the gearmotor rotates the crank. The motor can turn the crank via one-way clutch bearing to lift the linear slider and hammer against the spring resistance. When the crank passes maximum lift, the torque induced by the spring tension can drop to zero and reverse such that the torque is in the freewheel direction of the one-way bearing. This can allow the crank to rotate freely and the hammer to drop, creating a shock impulse into a strike plate. This can occur when the strike plate is in direct contact with a surface to be tested (e.g., a lunar or planetary surface). The one-way bearing can prevent any kind of bounce back and chatter in the impulse signal. The linear bearing can be splined. Accordingly, alignment of the hammer can be maintained by the splined linear bearing. A spring constant of 186 lb/in and compression of 1.2 in can yield 15.1 J of kinetic energy injection into a 10 cm×10 cm×0.1 cm plate attached to, or defined by, the lander footpad. The assembly can produce a variable hammering rate at least once every 20 seconds. The assembly can have a total mass of 2 kg, with spatial dimensions of 100 mm×100 mm×200 mm. The assembly can have a power usage of 11.2 W avg., 22.4 W peak.

The assembly 10 can be mounted to, or integrated into, one or more of the feet of a lander, advantageously using the footpad as a strikeplate. The footpad can provide firm contact to the ground due to lander's weight. In alternative aspects, the assembly can be a stand-alone deployable unit or mounted to the belly pan of the lander that is put in contact with the surface by squatting the lander. Major advantages to the design include low power draw, autonomous repeatability, no chatter due to re-contact of the hammer, and lack of ordnance charges.

The gearmotor can use appropriate gear ratios to control electrical power draw. By using high gear ratios, a lower electrical current draw spread over a longer period of time can reduce the immediate power needs to impart a required energy into the strike. This can be useful for battery-powered missions as electrical wiring is often reduced in size, thereby limiting current-carrying capability. It can be particularly useful for solar-powered missions as solar energy is virtually limitless, while current draw can be restricted based upon available solar array sizing. In short, the gearmotor can be tuned to convert electrical energy into the energy of the impulse strike based upon the available electrical architecture.

The one-way bearing can serve at least three purposes. First, the one-way bearing can enable the gearmotor to store spring energy via mechanical resistance (in the form of torque) while providing a mechanism to instantly release that energy and facilitate the strike. Second, the one-way bearing can allow as many strikes as a mission requires as it self-resets after each hit; the gearmotor need only be reactivated to create the next impulse. Third, the one-way bearing can prevent rebounding of the slider/hammer after the initial strike. This means the impulse is crisp with no follow-on chatter from the hammer re-contacting the strike plate. In short, the device automatically rests and imparts a chatter-free impulse.

While there are many conventional technologies used to accomplish an artificial seismic source on Earth, these designs are unsuitable to spacecraft. Terrestrial designs need not worry about autonomy, since geologic sites are generally actively manned. Conventional designs also do not have the restrictive weight, size, and power requirements of spacecraft. However, it is further contemplated that the disclosed assembly can have terrestrial uses. For example, the assembly can be used in remotely-operated geologic sites relying on solar power. Compact size and low weight can also be beneficial in various applications, as the equipment is often packed to the site.

EXEMPLARY ASPECTS

In view of the described devices, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: An assembly comprising:
a motor;
a drive shaft coupled to the motor;
a crank that is coupled to the drive shaft, wherein the motor is configured to impart rotation of the crank in a first rotational direction;
a one-way bearing that permits rotation of the crank relative to the drive shaft in the first rotational direction and inhibits rotation of the crank relative to the drive shaft in an opposed second rotational direction;
a strike plate coupled to the motor;
a track;
a hammer that is movable along the track along an axis that extends toward and away from the strike plate, wherein the hammer is configured to contact the strike plate;
a biasing element that is configured to bias the hammer toward the strike plate; and
a linkage arm that couples the hammer to the crank, wherein the linkage arm is configured to translate rotational movement of the crank to linear movement of the hammer.

Aspect 2: The assembly of aspect 1, further comprising gearing that couples the motor to the crank.

Aspect 3: The assembly of aspect 2, wherein the motor and gearing are provided as a gearmotor.

Aspect 4: The assembly of any one of the preceding aspects, wherein the linkage arm permits play along the axis of the hammer relative to the crank.

Aspect 5: The assembly of aspect 4, wherein the linkage arm has a length, the linkage arm defines a slot that is elongate along the length of the linkage arm, wherein the assembly further comprises a fastener that extends through the slot and couples the hammer to the linkage arm, wherein the fastener is slidable within the slot to define the play along the axis of the hammer relative to the crank.

Aspect 6: The assembly of any one of the preceding aspects, wherein the hammer is movable along the axis by a predetermined maximum distance, wherein the predetermined maximum distance and a force provided by the biasing element cooperate to define an impact energy of the hammer against the strike plate.

Aspect 7: The assembly of aspect 6, wherein the impact energy is between 5 joules and 25 joules.

Aspect 8: The assembly of aspect 7, wherein the impact energy is between 10 joules and 15 joules.

Aspect 9: The assembly of any one of aspects 6-8, wherein the predetermined maximum distance is from about one half inch to about three inches.

Aspect 10: The assembly of aspect 9, wherein the predetermined maximum distance is about one inch.

Aspect 11: The assembly of any one of aspects 6-10, wherein the biasing element is a spring having a spring constant from about 100 to about 500 lb/in.

Aspect 12: The assembly of any one of the preceding aspects, wherein the biasing element is a coil spring.

Aspect 13: The assembly of any one of the preceding aspects, wherein the one-way bearing is a locking needle roller bearing.

Aspect 14: The assembly of any one of aspects 1-12, wherein the one-way bearing comprises a pawl and ratchet.

Aspect 15: The assembly of any one of the preceding aspects, wherein the track comprises a shaft, wherein the assembly comprises a bushing that is slidable along the shaft, wherein the hammer is coupled to the bushing.

Aspect 16: The assembly of aspect 15, wherein the shaft is a spline shaft.

Aspect 17: The assembly of aspect 15 or aspect 16, wherein the biasing element is a spring that is coiled around the shaft.

Aspect 18: The assembly of any one of the preceding aspects, further comprising a frame that couples the strike plate to the motor.

Aspect 19: The assembly of any one of the preceding aspects wherein the motor has a peak power output of less than 30 watts.

Aspect 20: The assembly of any one of the preceding aspects wherein the motor has an average power output of less than 15 watts.

Aspect 21: The assembly of any one of the preceding aspects, further comprising:
a crank housing, wherein the crank is rotatable relative to the crank housing; and
a bearing that permits rotation of the crank relative to the housing.

Aspect 22: A lander comprising at least one assembly as in any one of the preceding aspects.

Aspect 23: The lander of aspect 22, wherein the lander comprises at least one footpad, wherein the at least one footpad defines the strike plate of the at least one assembly.

Aspect 24: The lander of aspect 23, wherein the at least one footpad comprises at least a first footpad and a second footpad, wherein the at least one assembly comprises first and second assemblies, wherein the first footpad defines the strike plate of the first assembly, and wherein the second footpad defines the strike plate of the second assembly.

Aspect 25: The lander of aspect 22, wherein the lander comprises a belly that is configured to contact a planetary surface, wherein the belly defines the strike plate of the at least one assembly.

Although the foregoing invention has been described in some detail by way of illustration and example for purposes of clarity of understanding, certain changes and modifications may be practiced within the scope of the appended claims.

What is claimed is:

1. An assembly comprising:
a motor;
a drive shaft coupled to the motor;
a crank that is coupled to the drive shaft, wherein the motor is configured to impart rotation of the crank in a first rotational direction;
a one-way bearing that permits rotation of the crank relative to the drive shaft in the first rotational direction and inhibits rotation of the crank relative to the drive shaft in an opposed second rotational direction;
a strike plate coupled to the motor;
a track;
a hammer that is movable along the track along an axis that extends toward and away from the strike plate, wherein the hammer is configured to contact the strike plate;
a biasing element that is configured to bias the hammer toward the strike plate; and
a linkage arm that couples the hammer to the crank, wherein the linkage arm is configured to translate rotational movement of the crank to linear movement of the hammer.

2. The assembly of claim 1, further comprising gearing that couples the motor to the crank.

3. The assembly of claim 2, wherein the motor and gearing are provided as a gearmotor.

4. The assembly of claim 1, wherein the linkage arm permits play along the axis of the hammer relative to the crank.

5. The assembly of claim 4, wherein the linkage arm has a length, wherein the linkage arm defines a slot that is elongate along the length of the linkage arm, wherein the assembly further comprises a fastener that extends through the slot and couples the hammer to the linkage arm, and wherein the fastener is slidable within the slot to define the play along the axis of the hammer relative to the crank.

6. The assembly of claim 1, wherein the hammer is movable along the axis by a predetermined maximum distance, and wherein the predetermined maximum distance and a force provided by the biasing element cooperate to define an impact energy of the hammer against the strike plate.

7. The assembly of claim 6, wherein the impact energy is between 5 joules and 25 joules.

8. The assembly of claim 7, wherein the impact energy is between 10 joules and 15 joules.

9. The assembly of claim 6, wherein the predetermined maximum distance is from about one-half inch to about three inches.

10. The assembly of claim 9, wherein the predetermined maximum distance is about one inch.

11. The assembly of claim 6, wherein the biasing element is a spring having a spring constant from about 100 lb/in to about 500 lb/in.

12. The assembly of claim 1, wherein the one-way bearing is a locking needle roller bearing.

13. The assembly of claim 1, wherein the one-way bearing comprises a pawl and ratchet.

14. The assembly of claim 1, wherein the track comprises a shaft, wherein the assembly comprises a bushing that is slidable along the shaft, and wherein the hammer is coupled to the bushing.

15. The assembly of claim 1, wherein the shaft is a spline shaft.

16. The assembly of claim 15, wherein the biasing element is a spring that is coiled around the shaft.

17. The assembly of claim 1, further comprising a frame that couples the strike plate to the motor.

18. The assembly of claim 1, wherein the motor has a peak power output of less than 30 watts.

19. The assembly of claim 1, further comprising:
a crank housing, wherein the crank is rotatable relative to the crank housing; and
a bearing that permits rotation of the crank relative to the crank housing.

20. A lander comprising:
a footpad; and an assembly as in claim 1, wherein the assembly is associated with the footpad.

\* \* \* \* \*